(12) United States Patent
Schuh et al.

(10) Patent No.: US 11,841,794 B2
(45) Date of Patent: Dec. 12, 2023

(54) MEMORY SUB-SYSTEM WRITE SEQUENCE TRACK

(71) Applicant: Micron Technology, Inc., Boise, ID (US)

(72) Inventors: Karl D. Schuh, Santa Cruz, CA (US); Vamsi Pavan Rayaprolu, San Jose, CA (US); Jiangang Wu, Fremont, CA (US); Kishore K. Muchherla, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 102 days.

(21) Appl. No.: 17/536,928

(22) Filed: Nov. 29, 2021

(65) Prior Publication Data

US 2022/0188223 A1 Jun. 16, 2022

Related U.S. Application Data

(60) Provisional application No. 63/126,355, filed on Dec. 16, 2020.

(51) Int. Cl.
*G06F 12/00* (2006.01)
*G06F 12/02* (2006.01)
*G06F 12/0882* (2016.01)
*G06F 3/06* (2006.01)

(52) U.S. Cl.
CPC .......... *G06F 12/0246* (2013.01); *G06F 3/064* (2013.01); *G06F 3/0614* (2013.01); *G06F 3/0659* (2013.01); *G06F 3/0679* (2013.01); *G06F 12/0882* (2013.01); *G06F 2212/7201* (2013.01)

(58) Field of Classification Search
CPC .... G06F 12/0246; G06F 3/0614; G06F 3/064; G06F 3/0659; G06F 3/0679; G06F 12/0882; G06F 2212/7201; G06F 3/061; G06F 3/0653; G11C 16/0483; G11C 16/26
USPC ......................................................... 711/154
See application file for complete search history.

(56) References Cited

U.S. PATENT DOCUMENTS 7,984,233 B2 * 7/2011 Sinclair ................. G06F 3/0607
711/202
8,751,731 B2 6/2014 Asnaashari et al.
(Continued)

FOREIGN PATENT DOCUMENTS

CN 101681299 * 3/2010
CN 107391296 B * 11/2020 .......... G06F 11/1004
(Continued)

*Primary Examiner* — Mardochee Chery
(74) *Attorney, Agent, or Firm* — Brooks, Cameron & Huebsch, PLLC

(57) ABSTRACT

A system includes a memory device and a processing device communicatively coupled to the memory device. The processing device is to write data to a number of groups of memory cells of the memory device in a physically non-contiguous manner. The processing device is further to track a sequence in which the number of groups of memory cells were written with the data. In response to a trigger event, the processing device is further to identify at least a portion of the number of groups of memory cells having data received over a predefined period preceding the trigger event based at least in part on the tracked sequence.

18 Claims, 9 Drawing Sheets

(56) References Cited

U.S. PATENT DOCUMENTS

2019/0205244 A1\* 7/2019 Smith ................ G06F 3/065
2021/0263844 A1\* 8/2021 Lee ................ G06F 12/0246

FOREIGN PATENT DOCUMENTS

DE      69635962    \* 11/2006
JP     2008130088 A \*  6/2008  ......... G06F 12/0246

\* cited by examiner

MEMORY SUB-SYSTEM WRITE SEQUENCE TRACK

PRIORITY INFORMATION

This application claims the benefit of U.S. Provisional Application No. 63/126,355, the contents of which are include herein by reference.

TECHNICAL FIELD

Embodiments of the disclosure relate generally to memory systems and more specifically relate to a memory sub-system write sequence track

BACKGROUND

A memory system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
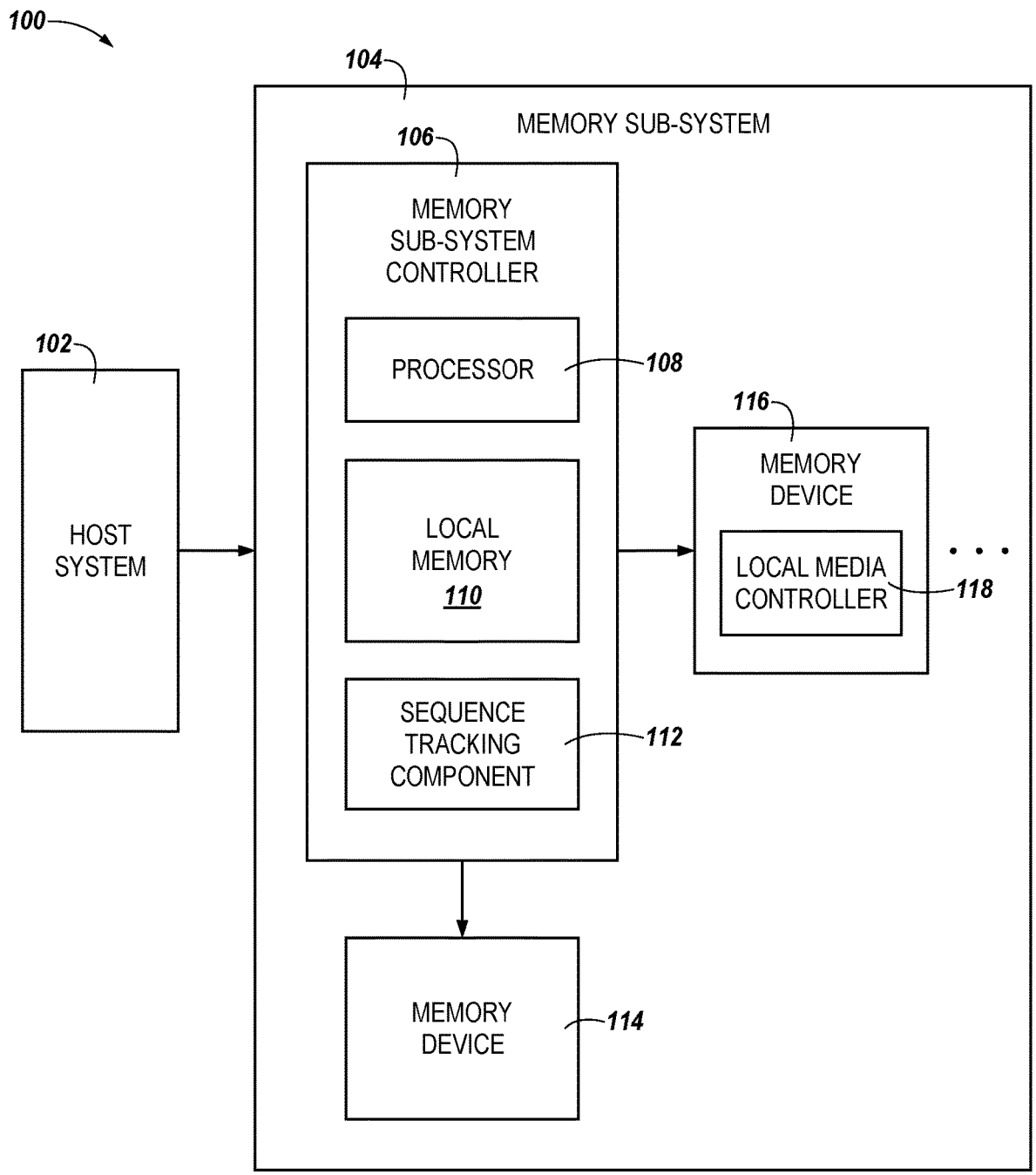
FIG. 1 illustrates an example computing system that includes a memory sub-system in accordance with some embodiments of the present disclosure.

Aspects of the present disclosure are directed to a memory sub-system write sequence track. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices, such as memory devices that store data. The host system can provide data to be stored at the memory sub-system and can request data to be retrieved from the memory sub-system.

The memory sub-system can be used for storage of data by various components of the vehicle, such as applications that are run by a host system of the vehicle. One examples of such an application is an event recorder of the vehicle. The event recorder may also be referred to as a "black box" or accident data recorder.

The emergence of autonomous vehicles, Internet of Things (IoT), and surveillance devices has resulted in a wider gap in between the total bytes written (TBW) in a useable lifetime of a memory sub-system and a user capacity of the memory sub-system. For example, the TBW to user capacity ratio for some memory systems used for such applications has increased by one to three orders of magnitude. Some autonomous vehicles require real time buffering of telemetric data such as video cameras, radar, lidar, ultra-sonic and other sensors that are necessary to playback the sequences preceding an accident. The data from various sensors sums up to a substantial throughput requirement per unit time (e.g., 1 gigabyte per second (GB/sec) sequential write throughput from a host). Upon a trigger event, a quantity of data corresponding to a predetermined playback time immediately preceding the event needs to be captured (e.g., to determine the cause of an accident). The recorded telemetric sensor data corresponding to the predetermined playback time can be referred to as a "snapshot". An event recorder is one such application in where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. An event recorder may need to store at least a few, most recent snapshots.

A flash memory device can include a flash transition layer (FTL) that can be used (e.g., during a programming operation performed on the flash memory device) to map logical addresses to physical addresses in the flash memory (e.g., via a logical to physical (L2P) table). As an example, in some previous approaches, an entry in a logical to physical (L2P) address mapping table can include a reference to a die, block, plane, and page of memory that a portion of data is stored in. Further, a die can include a number of planes, the number of planes can each include a number of blocks, and the number of blocks can each include a number of pages.

As the memory sub-system of the event recorder consistently receives input data from sensor and write the received data into the memory (e.g., non-volatile storage array, NAND) in a sequential manner, the address mapping tables is often required to be updated each time new data are written to the memory such that logically sequential entries of the address mapping tables indicate a sequence in which corresponding physical addresses were programmed. However, such an approach can incur a relatively large TBW, require larger portions of the memory, and/or make it difficult to manage. Accordingly, it is desirable to minimize an amount of resources of the memory sub-system of the event recorder in maintaining the address mapping table.

Aspects of the present disclosure address the above and other deficiencies by having a memory sub-system that captures a snapshot without exhausting substantial amount of resources of the memory sub-system in maintaining a L2P table. Without repetitively updating the L2P table each time new data were written to the memory sub-system, the memory sub-system of the present disclosure can simply track a sequence in which logical addresses were written with data. Once a trigger event is determined to have occurred, the memory sub-system can simply generate a list indicating where in memory portions (and/or corresponding logical addresses) data are stored and a sequence in which the memory portions were written with the data. Accordingly, when retrieving the snapshot, the data corresponding to the snapshot can be simply retrieved from the memory portions and reorganized based on the sequence indicated by the list. Such an approach can substantially reduce the TBW that would have been incurred from maintaining the address mapping tables according to previous approaches.

FIG. 1 illustrates an example computing system 100 that includes a memory sub-system 104 in accordance with some embodiments of the present disclosure. The memory sub-system 104 can include media, such as one or more volatile memory devices (e.g., memory device 114), one or more non-volatile memory devices (e.g., memory device 116), or a combination of such.

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), IoT enabled device, embedded computer (e.g., one included in a vehicle, industrial equipment, or a networked commercial device), or similar computing system that includes memory and a processing device.

The computing system 100 includes a host system 102 that is coupled to one or more memory sub-systems 104. In some embodiments, the host system 102 is coupled to different types of memory sub-systems 104. FIG. 1 illustrates one example of a host system 102 coupled to one memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

In at least one embodiment, the host system 102 is a computing device that controls a vehicle, such as an autonomous vehicle, and the memory sub-system 104 is an SSD that provides event recorder storage for the vehicle. For example, the memory sub-system 104 can store time-based telemetric sensor data for the vehicle.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access components (e.g., memory devices 116) when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to write data to the memory sub-system 104 or to read data from the memory sub-system 104. The data to be written or read, as specified by a host request, is referred to as "host data." A host request can include logical address information. The logical address information can be a logical block address (LBA), which can include or be accompanied by a partition number. The logical address information is the location the host system associates with the host data. The logical address information can be part of metadata for the host data. The LBA can also correspond (e.g., dynamically map) to a physical address, such as a physical block address (PBA), that indicates the physical location where the host data is stored in memory.

The memory devices 114, 116 can include any combination of the different types of non-volatile memory devices and/or volatile memory devices. The volatile memory devices (e.g., memory device 114) can be, but are not limited to, random access memory (RAM), such as dynamic random-access memory (DRAM) and synchronous dynamic random access memory (SDRAM).

Some examples of non-volatile memory devices (e.g., memory device 116) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 114 and 116 can include one or more arrays of memory cells. One method of operating a memory cell includes storing one-bit per cell, which is referred to as a single level cell (SLC). The "level" refers to the quantity of states to which the cell is programed, other than an erased state (level). An SLC can be programmed to one level other than the erased level. Other methods of operating memory cells include storing more than one bit per cell, such as multi-level cells (MLCs), triple level cells (TLCs), quad-level cells (QLCs), and penta-level cells (PLCs), among others. As used herein, "multi-level cells (MLCs)" refers to a memory cell that is programmable to two levels other than an erased level. In some embodiments, the non-volatile memory device 116 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the non-volatile memory device 116 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 116 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 106 (or controller 106 for simplicity) can communicate with the memory device 116 to perform operations such as reading data, writing data, erasing data, and other such operations at the non-volatile memory device 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processor 108 (e.g., a processing device) configured to execute instructions stored in a local memory 110. In the illustrated example, the local memory 110 of the memory sub-system controller 106 includes an embedded memory configured to store instructions for performing various processes, operations, logic flows, and routines that control operation of the memory sub-system 104, including handling communications between the memory sub-system 104 and the host system 102.

In some embodiments, the local memory 110 can include memory registers storing memory pointers, fetched data, etc. The local memory 110 can also include ROM for storing micro-code, for example. While the example memory sub-system 104 in FIG. 1 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive commands or operations from the host system 102 and can convert the commands or operations into instructions or appropriate commands to achieve the desired access to the memory device 116 and/or the memory device 114. The memory sub-system controller 106 can be responsible for other operations such as wear leveling operations, garbage collection operations, error detection and/or correction operations, encryption operations, caching operations, and address translations between a logical address (e.g., LBA, namespace) and a physical address (e.g., physical block address, physical media locations, etc.) associated with the memory device 116. The memory sub-system controller 106 can further include host interface circuitry to communicate with the host system 102 via the physical host interface. The host interface circuitry can convert the commands received from the host system 102 into command instructions to access the memory device 116 and/or the memory device 114 as well as convert responses associated with the memory device 116 and/or the memory device 114 into information for the host system 102.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 106 and decode the address to access the memory device 116 and/or the memory device 114.

In some embodiments, the memory device 116 includes a local media controller 118 that operates in conjunction with memory sub-system controller 106 to execute operations on one or more memory cells of the memory device 116. An external controller (e.g., memory sub-system controller 106) can externally manage the non-volatile memory device 116 (e.g., perform media management operations on the memory device 116). In some embodiments, a memory device 116 is a managed memory device, which is a raw memory device combined with a local controller (e.g., local controller 118) for media management within the same memory device package. An example of a managed memory device is a managed NAND (MNAND) device.

The memory sub-system controller 106 can also include a sequence tracking component 112. Although not shown in FIG. 1 so as to not obfuscate the drawings, the sequence tracking component 112 can include various circuitry to facilitate performance of the operations described herein. For example, the sequence tracking component 112 can include special purpose circuitry in the form of an ASIC, FPGA, state machine, and/or other logic circuitry that can allow the sequence tracking component 112 to orchestrate and/or perform the operations described herein.

In some embodiments, the memory sub-system controller 106 includes at least a portion of the sequence tracking component 112. For example, the memory sub-system controller 106 can include a processor (e.g., processing device) configured to execute instructions stored in local memory 110 for performing the operations described herein. In some embodiments, the sequence tracking component 112 is part of the host system 102, an application, or an operating system.

The sequence tracking component 112 can track a sequence in which memory portions of the memory devices 114 and 116 are written with received data. In response to a trigger event, the tracked sequence can be utilized to identify a sequence in which memory portions were programmed with data received over a predefined period immediately preceding the trigger event (alternatively referred to as a snapshot). The identified sequence can be stored in forms of a certain type of data (e.g., linked list 331 illustrated in FIGS. 3A-3B) in the memory device 116, for example. The stored data associated with the identified sequence can later be utilized to retrieve the data corresponding to the snapshot. As further described herein, a predefined period preceding the trigger event can be determined/known based on a known size of a snapshot.

Figure 2:
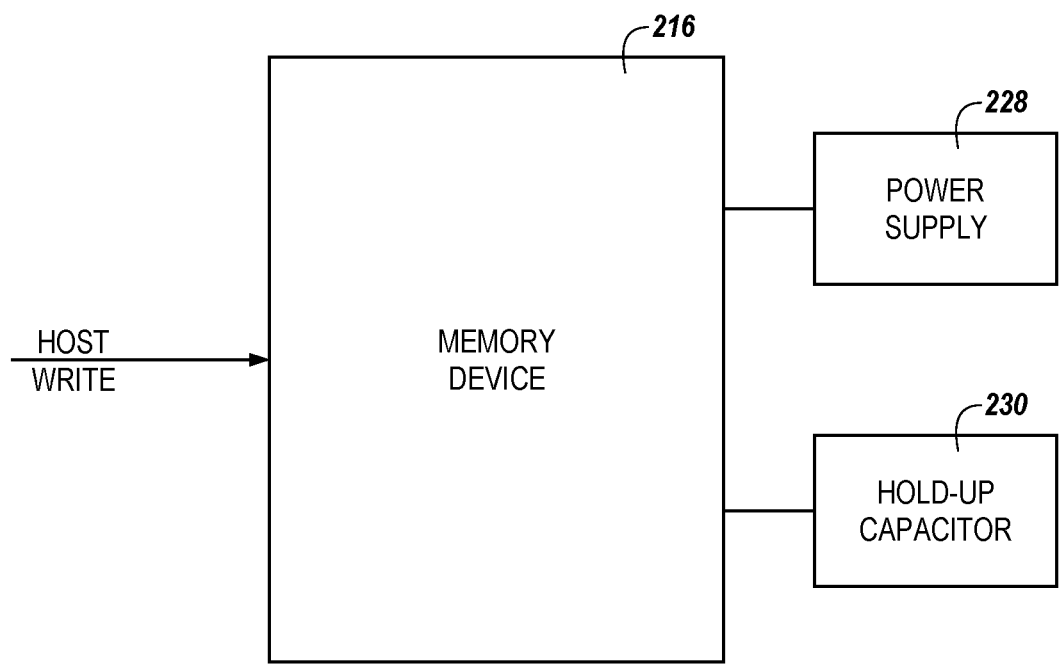
FIG. 2 illustrates an example of a memory device in accordance with some embodiments of the present disclosure.

FIG. 2 illustrates an example of a memory device 216 in accordance with some embodiments of the present disclosure. Host data can be received by the memory sub-system (e.g., from the host system 102 illustrated in FIG. 1). The host data can be time based telemetric sensor data from different sensors of a vehicle. The time-based telemetric sensor data from the different sensors can be aggregated by the host and sent to the memory sub-system at a data rate. The host data can be received by the memory sub-system and stored in the non-volatile memory device 216. As the non-volatile memory device 216 is filled with host data, new data received from the host is stored sequentially, but data that is determined to be older than a threshold time in the non-volatile memory device 216 can be erased or overwritten. The non-volatile memory device 216 can therefore operate as a first-in, first-out (FIFO) buffer, where newly received data replaced the oldest data therein. Accordingly, other than where data were written are not inherently known without tracking, which data were written prior to the other data being written are inherently known such that data written during a particular period can be readily identifiable as long as a sequence in which memory portions were written with the data is known.

Upon occurrence of a trigger event, memory portions of the non-volatile memory device 216 storing an amount of the time-based telemetric sensor data from the cyclic buffer portion 222 can be identified. The amount of host data corresponding to a defined period of time, which can be referred to as a playback time (e.g., 30 seconds), is referred to as a snapshot size and the data itself over that defined period of time is referred to as a snapshot. The snapshot size can be predefined for a period of time immediately preceding a trigger event. The snapshot size and/or playback time can be a predefined value programmed to the memory sub-system by a manufacturer, supplier, or user of the memory sub-system. In some embodiments, the determination that a trigger event has occurred can include actuation of a trigger signal based at least in part upon received sensor information from a host that is above a threshold, such as a quantitative value. In some embodiments, the trigger event can include receipt of a host-triggered signal (regardless of sensor information), which includes a circumstance where the non-volatile memory device 216 is brought to a service center.

The non-volatile memory device 216 can be powered by a power supply 228 of the memory sub-system under normal circumstances. However, the non-volatile memory device 216 can be powered by a backup power supply, such as one or more hold-up capacitors 230, in response to a loss of system power (e.g., the power supply 228), which can be associated with a trigger event, such as a vehicle accident, which can be a host-triggered event. The host-triggered event can include a vehicle accident, loss of power from a power supply (e.g., the power supply 228), and/or a host-request (e.g., issued from the host system 102 regardless of car accidents or power loss) to initiate a trigger event. A size and/or quantity of the hold-up capacitor(s) 230 are sufficient to provide enough power while, for example, memory portions of the non-volatile memory device 216 storing a snapshot are being identified. As illustrated, the power supply 228 and the hold-up capacitor 230 are coupled to the memory device 216 to provide power therefor. When there is not a direct physical connection between either the power supply 228 or the hold-up capacitor 230 and the non-volatile memory device 216, but the power can be provided through write circuitry (not specifically illustrated).

Once those memory portions storing data corresponding to a snapshot are identified, the snapshot can be retrieved at a later time. This includes a circumstance where the non-volatile memory device 216 is brought to a service center and provided recovery of the reliability. As further described herein in connection with FIGS. 3-4, a sequence can be stored as a certain type of data, such as a linked list 331 illustrated in FIG. 3. Further, memory portions at which data were written can be superblocks.

Figure 3A:
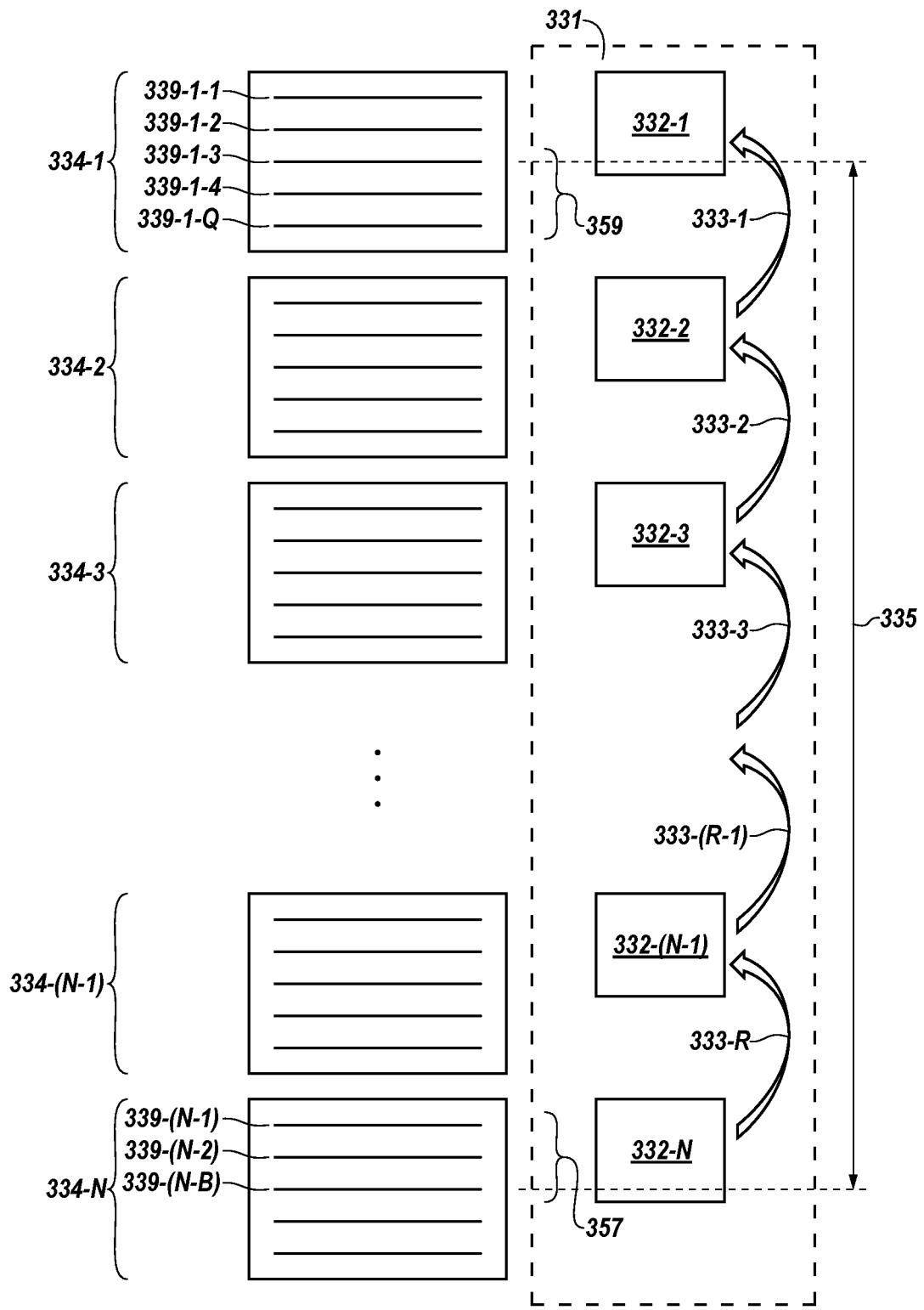
FIG. 3A illustrates a diagram associated with identifying superblocks having data corresponding to a snapshot using a liked list in accordance with some embodiments of the present disclosure.

FIG. 3A illustrates a diagram associated with identifying superblocks 334 having data corresponding to a snapshot using a liked list 331 in accordance with some embodiments of the present disclosure. A further described in connection with FIG. 7, as used herein, the term "superblock" is a set of data blocks that span multiple die that are written in an interleaved fashion. In some cases, a superblock may span all the die within a memory sub-system, such as an SSD. A superblock may contain multiple data blocks from a single die. A superblock may be a unit of management within the memory sub-system.

As illustrated in FIG. 3A, data can be written sequentially to the superblocks 334-1, 334-2, 334-3, . . . , 334-(N−1), and 334-N. Although not depicted in FIG. 3A, superblocks 334-1, 334-2, 334-3, . . . , 334-(N−1) are not physically contiguous; therefore, data are written to the superblocks 334 in a physically non-contiguous manner. For example, as illustrated in FIG. 3A, once data are written to the superblock 334-1, subsequent data can be written to the superblock 334-2 that is not contiguous to the superblock 334-1. In contrast, pages (e.g., pages 339-1-1, . . . , 339-1-Q) within each superblock 334 illustrated in FIG. 3A are physically contiguous to one another such that data can be written to pages in a physically contiguous manner within each superblock 334. For example, when writing data to the superblock 334-1, data can be written sequentially in an order of a page 339-1-1 to a page 339-1-Q. Therefore, a sequence at which pages are written with data can be known without necessarily tracking the sequence. As described above, it can be desirable to track a sequence at which superblocks 334 are written with data.

In this manner, a sequence at which superblocks (e.g., superblocks 334) are written can be continuously monitored and tracked. In response to an occurrence of a trigger event, a linked list (e.g., the linked list 331) can be generated based on the tracked sequence. A linked list can include identifiers for respective superblocks 334 and/or pages 339 within the superblocks 334, and can link groups of two or more superblocks, which can allow for identification of which of the superblocks (e.g., the superblock 334-1) were programmed earlier than another superblock (e.g., the superblock 334-2).

As illustrated in FIG. 3A, for example, a trigger event is determined to have occurred while writing data to a page 339-N-B of the superblock 334-N. Therefore, the page 339-N-B corresponds to an end time of a predefined period preceding the trigger event. In this example, the sequence in which superblocks 334 were programmed can be reversely tracked from the page 339-N-B until a collective size of pages/superblocks being tracked reaches a known size of a snapshot, such as the known size 335 of the snapshot. Based on the reversely tracked sequence, the linked list 331 can be generated. As illustrated in FIG. 3A, the liked list 331 includes identifiers 332-1, 332-2, . . . , 332-N symbolically representing superblocks 334-1, . . . , 334-N with a link 333-R indicating that the superblock 334-N was programmed subsequent to the superblock 334-(N−1); a link 333-2 indicating that the superblock 334-3 was programmed subsequent to the superblock 334-2; and the liked list 331 includes a link 333-1 indicating that the superblock 334-2 was programmed subsequent to the superblock 334-1. The linked list 331 further includes an identifier/logical address (not shown in FIG. 3A) corresponding to the page 339-1-3 to indicate that reversely tracking the known size 335 of the snapshot has ended at the page 339-1-3 and excludes pages 339-1-1 and 339-1-2 from being part of the snapshot. Stated alternatively, the identifier/logical address corresponding to the page 339-1-3 corresponds to a start time of the predefined period. As a result, the linked list 331 indicates that data corresponding to a snapshot are stored in a portion 357 of the superblock 334-N (e.g., from page 339-N−1 to page 339-N-B), superblock 334-(N−1), . . . , superblock 334-3, superblock 334-2, and a portion 359 of the superblock 334-1 (e.g., the rest of the pages starting from a page 339-1-3 of the superblock 334-1). As used herein, the term "identifier" refers to information utilizable to identify one superblock from the others. For example, the identifier can include a logical address (e.g., LBA), a physical address, etc.

In some embodiments, a link (e.g., links 333-1, . . . , 333-R) can be a pointer. For example, the link 333-1 can be a pointer indicating (e.g., a logical address of) the superblock 334-2 from (e.g., a logical address of) the superblock 334-1; the link 333-2 can be a pointer indicating (e.g., a logical address of) the superblock 334-3 from (e.g., a logical address of) the superblock 334-2; the link 333-R can be a pointer indicating (e.g., a logical address of) the superblock 334-N from (e.g., a logical address of) the superblock 334-(N−1).

Using a linked list (e.g., the linked list 331) to identify where data corresponding to a snapshot are stored can provide benefits over previous approaches by eliminating a need to substantially maintain an address mapping table. In previous approaches, those sequentially received sets of data were required to be stored in logically sequential entries (e.g., of the address mapping table) to track a sequence in which memory portions were programmed. Such an approach exhausts a significant amount of resources of the memory sub-system as the address mapping table needs to be updated each time a new set of data are programmed (e.g., to the memory device 116 illustrated in FIG. 1). In contrast, such a degree of the maintenance of the address mapping table is not required to identify a sequence in a number of embodiments of the present disclosure. Rather, data indicating a sequence itself is generated separately from a L2P table in the present disclosure to identify the sequence even with the L2P table, in which logically sequential entries do not indicate a sequence in which corresponding physical addresses were programmed. Therefore, a L2P table of a number of embodiments of the present disclosure needs not be updated each time a new set of data is programmed to the memory device.

Figure 3B:
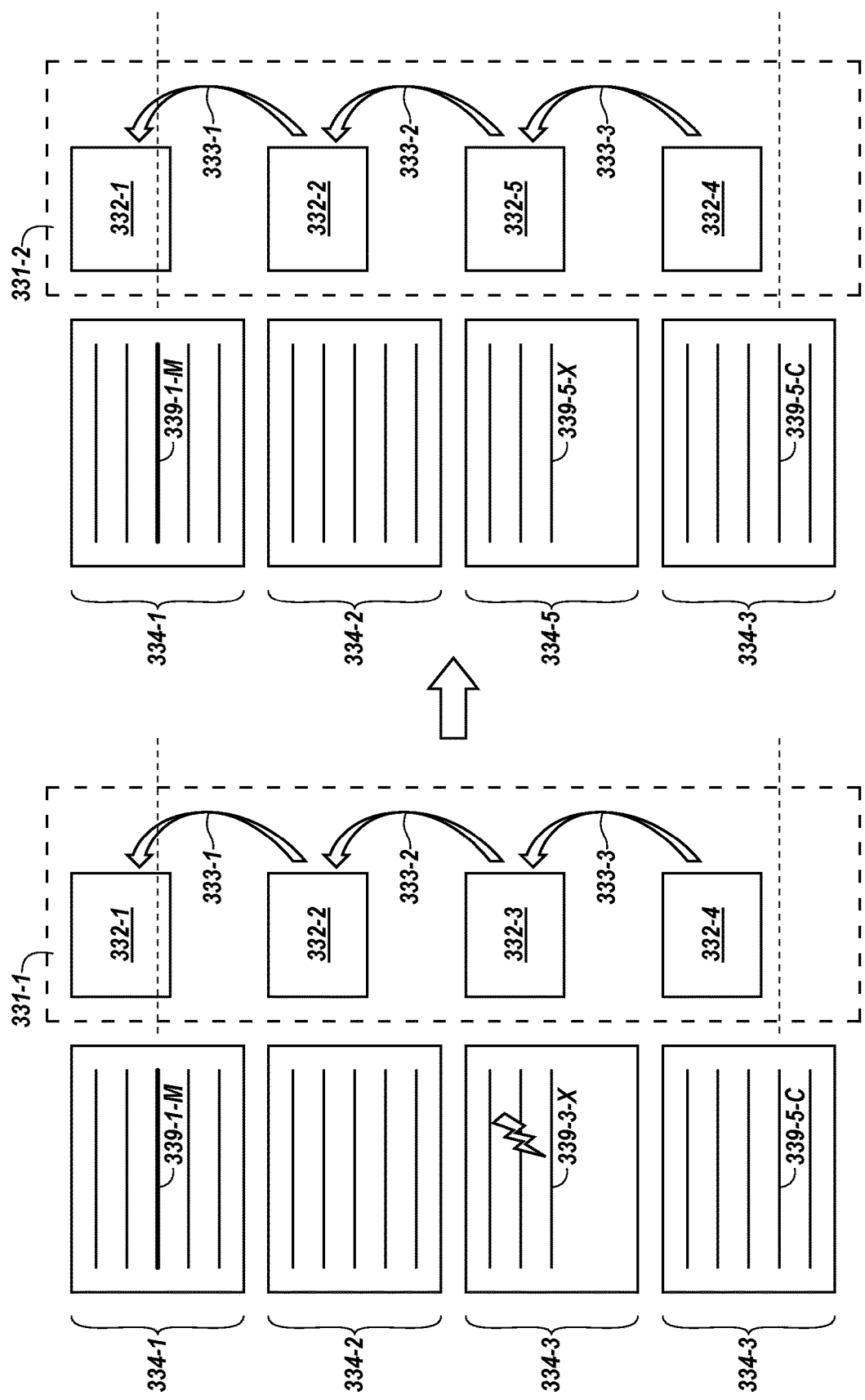
FIG. 3B illustrates another diagram associated with identifying superblocks having data corresponding to a snapshot using a liked list in accordance with some embodiments of the present disclosure.

FIG. 3B illustrates another diagram associated with identifying superblocks 334 having data corresponding to a snapshot using a liked list 331 in accordance with some embodiments of the present disclosure. The superblocks 334-1, . . . , 334-4 (collectively referred to as superblocks 334) of FIG. 3B can be analogous to the superblock 334 illustrated in FIG. 3A. Further, as illustrated in FIG. 3B, the linked lists 331-1 and 331-2 can be generated in response to a trigger event to indicate where in superblocks data corresponding to a snapshot are stored along with a sequence in which the superblocks were programmed with the data corresponding to the snapshot.

As illustrated in FIG. 3B, the liked list 331-1 generated in response to a trigger event indicates that data have been sequentially written to superblocks 334-1, . . . , 334-4 and data corresponding to a snapshot are stored in a portion of the superblock 334-1 (e.g., sequentially from the page 339-1-M to the last page of the superblock 334-1), superblock 334-2, a portion (e.g., starting from a first page and sequentially up to the page 339-3-X of the superblock 334-3) of the superblock 334-3, and a portion (e.g., starting from a first page and sequentially up to the page 339-3-C of the superblock 334-4) of the superblock 334-4. Although not depicted in FIG. 3B, at least some of the superblocks 334-1, . . . , 334-4 are not physically contiguous. Therefore, data are written to the superblocks 334 in a physically non-contiguous manner.

FIG. 3B further illustrates a situation where a program failure has occurred while writing to a particular superblock. For example, as illustrated in FIG. 3B, data have been sequentially written to superblocks 334-1, 334-2, and 334-3 and a program failure has occurred while writing data to a page 339-3-X of the superblock 334-3. When this happens, writing data to the superblock 334-3 can be suspended (without necessarily erasing data previously written to the superblock 334-3) and subsequent data can continue to be written to the superblock 334-4. Therefore, the linked list 331-1 can further includes information associated with the program failure. For example, the linked list 331-1 can further includes a logical address of the page 339-3-X indicating that the superblock 334-3 stores valid data only within pages starting from a first page and sequentially up to the page 339-3-X.

In some embodiments, a superblock at which a program failure has occurred can be refreshed to another superblock at a later time. When refreshed, the linked list can be modified to reflect that data (e.g., valid data) that have been stored in a failed superblock are refreshed to a new superblock. For example, as illustrated in FIG. 3B, valid data that have been stored in the superblock 334-3 can be refreshed to a superblock 334-5 at a later time. In this example, the previous linked list 331-1 indicating a sequence in an order of 334-1, 334-2, 334-3, and 334-4 can be modified to the linked list 331-2 indicating a sequence in an order of 334-1, 334-2, 334-5, and 334-4 with indication that the superblock 334-5 stores valid data in pages sequentially up to 339-5-X.

Figure 4:
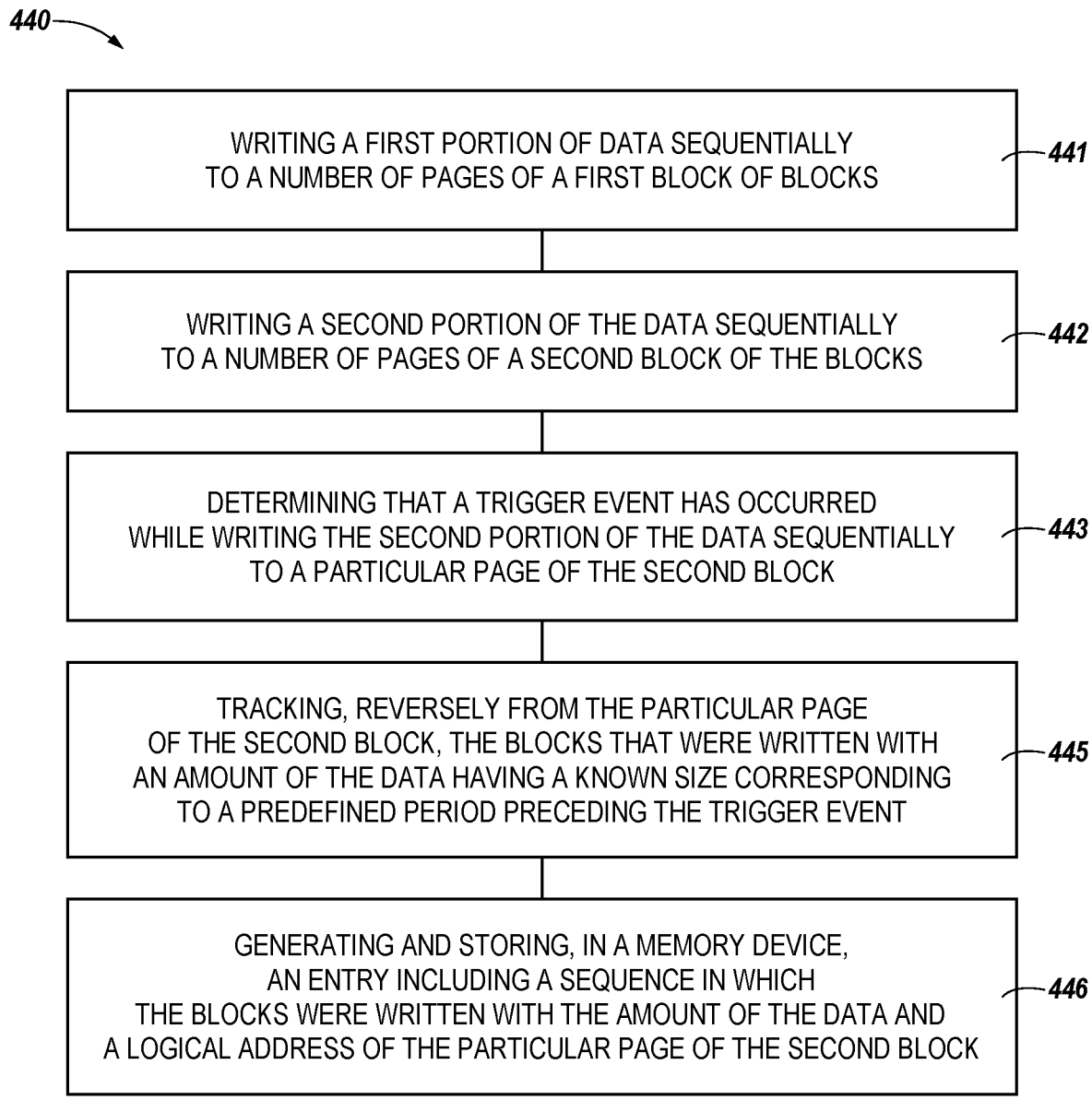
FIG. 4 is a flow diagram of an example method for write sequence tracking in accordance with some embodiments of the present disclosure.

FIG. 4 is a flow diagram of an example method 440 for write sequence tracking in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system controller 106, processing device 108, sequence tracking component 112, non-volatile memory device 116 and/or volatile memory device 114, and/or local media controller 118 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 441, a first portion of data can be sequentially written to a number of pages (e.g., pages 339 illustrated in FIGS. 3A-3B) of a first block of a plurality of blocks (e.g., superblocks 334 illustrated in FIGS. 3A-3B). At operation 442, subsequent to writing the first portion of the data sequentially to the number of pages of the first block, a second portion of the data can be sequentially written to a number of pages of the second block of the plurality of blocks. The second block need not be contiguous to the first block.

At operation 443, a trigger event can be determined to have occurred while writing the second portion of the data sequentially to a particular page of the second block. At operation 445, the plurality of blocks that were written with an amount of the data having a known size (e.g., known size 335 illustrated in FIG. 3A) can be reversely tracked from the particular page of the second block. The known size can correspond to a predefined period preceding the trigger event. Accordingly, the amount of the data can correspond to a snapshot.

At operation 446, an entry including a sequence in which the plurality of blocks were written with the amount of the data and a logical address of the particular page of the second block. The entry can be analogous to the linked list 331 illustrated in FIGS. 3A-3B. The entry can further include logical addresses of superblocks identified as including data corresponding to the snapshot. In some embodiments, the plurality of blocks that were written with the amount of the data can be reversely tracked based on known information, such as a known size of each one of the plurality of blocks, a known size of each one of the number of pages of each one of the plurality of blocks, a quantity of pages within each one of the plurality of blocks.

In some embodiments, the plurality of blocks can be tracked without maintaining a logical to physical table. For example, as described herein, a L2P table of the memory sub-system (e.g., the memory sub-system 104 illustrated in FIG. 1) need not be updated each time new data are written to the memory device (e.g., the memory sub-system 116 illustrated in FIG. 1) to indicate a sequence from logically sequential entries of the L2P table.

Subsequent to writing a portion of the first portion of the data to a first page of the first block, a program failure can occur while writing another portion of the first portion of the data to a second page of the first block. In this example, a logical address of the first page of the first block can be associated to the entry to indicate that only pages of the first block sequentially up to the first page store valid data. Accordingly, when retrieving the amount of the data (e.g., snapshot) at a later time, data can be read from a number of pages of the first block sequentially up to the first page.

Continuing with the example described above, a refresh operation can be performed on the first block to copy data (e.g., valid data stored in pages of the first block sequentially up to the first page, but not including the second page of the first block) to a third block of the plurality of blocks. In response to the refresh operation being performed, the sequence of the entry can be modified to replace the first block with the third block.

Figure 5:
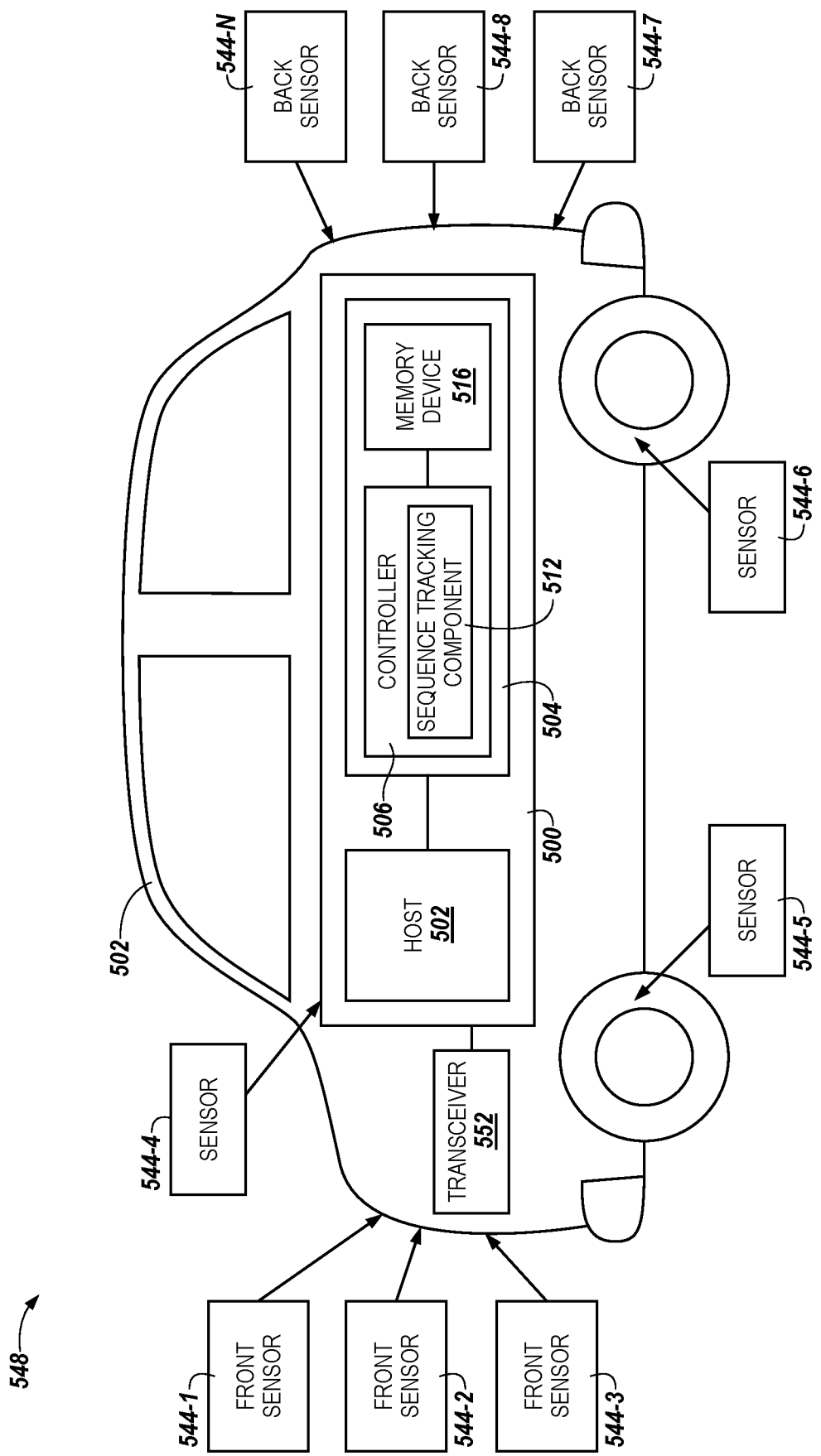
FIG. 5 illustrates an example of a system including a computing system in a vehicle in accordance with some embodiments of the present disclosure.

FIG. 5 illustrates an example of a system 548 including a computing system 500 in a vehicle 550 in accordance with some embodiments of the present disclosure. The computing system 500 can include a memory sub-system 504, which is illustrated as including a controller 506 and non-volatile memory device 516 for simplicity but is analogous to the memory sub-system 104 illustrated in FIG. 1. The controller 506 can be analogous to the memory sub-system controller 106 illustrated in FIG. 1. The controller 506 can further include a sequence tracking component 512 respectively within the controller 506. As described herein, the sequence tracking component 512, in some embodiments, can cause the controller 506 to perform operations described to be performed in association with the sequence tracking component 112.

The computing system 500, and thus the host 502, can be coupled to a number of sensors 544 either directly, as illustrated for the sensor 544-4 or via a transceiver 552 as illustrated for the sensors 544-1, 544-2, 544-3, 544-5, 544-6, 544-7, 544-8, . . . , 544-N. The transceiver 552 is able to receive time based telemetric sensor data from the sensors 544 wirelessly, such as by radio frequency communication. In at least one embodiment, each of the sensors 544 can communicate with the computing system 500 wirelessly via the transceiver 552. In at least one embodiment, each of the sensors 544 is connected directly to the computing system 500 (e.g., via wires or optical cables). As used herein, telemetric sensor data means that the data is collected by sensors 544 that are remote from the memory sub-system 504 that stores the data (the receiving equipment). The telemetric sensor data is time based because the data is correlated with time. The time corresponding to each data point can either be stored with the telemetric data or derivable therefrom based on some metric, such as a known start time for the data and a data rate. The time can be useful in the playback of the sequences preceding an accident, for example.

The vehicle 550 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 544 are illustrated in FIG. 5 as including example attributes. For example, sensors 544-1, 544-2, and 544-3 are camera sensors collecting data from the front of the vehicle 550. Sensors 544-4, 544-5, and 544-6 are microphone sensors collecting data from the front, middle, and back of the vehicle 550. The sensors 544-7, 544-8, and 544-N are camera sensors collecting data from the back of the vehicle 550. As another example, the sensors 544-5, 544-6 are tire pressure sensors. As another example, the sensor 544-4 is a navigation sensor, such as a global positioning system (GPS) receiver. As another example, the sensor 544-6 is a speedometer. As another example, the sensor 544-4 represents a number of engine sensors such as a temperature sensor, a pressure sensor, a voltmeter, an ammeter, a tachometer, a fuel gauge, etc. As another example, the sensor 544-4 represents a video camera.

In some embodiments, the system 500 can be related to a braking system of the vehicle and can receive time based telemetric sensor data from to the camera sensors 544, the temperature sensors 544, and/or acoustic sensors 544. In some embodiments, the system 500 can be related to a heating/cooling system of the vehicle and can receive time based telemetric sensor data from temperature sensors 544 and/or acoustic sensors 544. In some embodiments, the system 500 can be related to an ambient noise system and can receive time based telemetric sensor data from acoustic sensors 544.

The host 502 can execute instructions to provide an overall control system and/or operating system for the vehicle 550. The host 502 can be a controller designed to assist in automation endeavors of the vehicle 550. For example, the host 502 can be an advanced driver assistance system controller (ADAS). An ADAS can monitor data to prevent accidents and provide warning of potentially unsafe situations. For example, the ADAS can monitor sensors in the vehicle 550 and take control of vehicle 550 operations to avoid accident or injury (e.g., to avoid accidents in the case of an incapacitated user of a vehicle). The host 502 can be desired to act and make decisions quickly to avoid accidents. The memory sub-system 504 can store reference data in the non-volatile memory device 516 such that time based telemetric sensor data from the sensors 544 can be compared to the reference data by the host 502 in order to make quick decisions.

Figure 6:
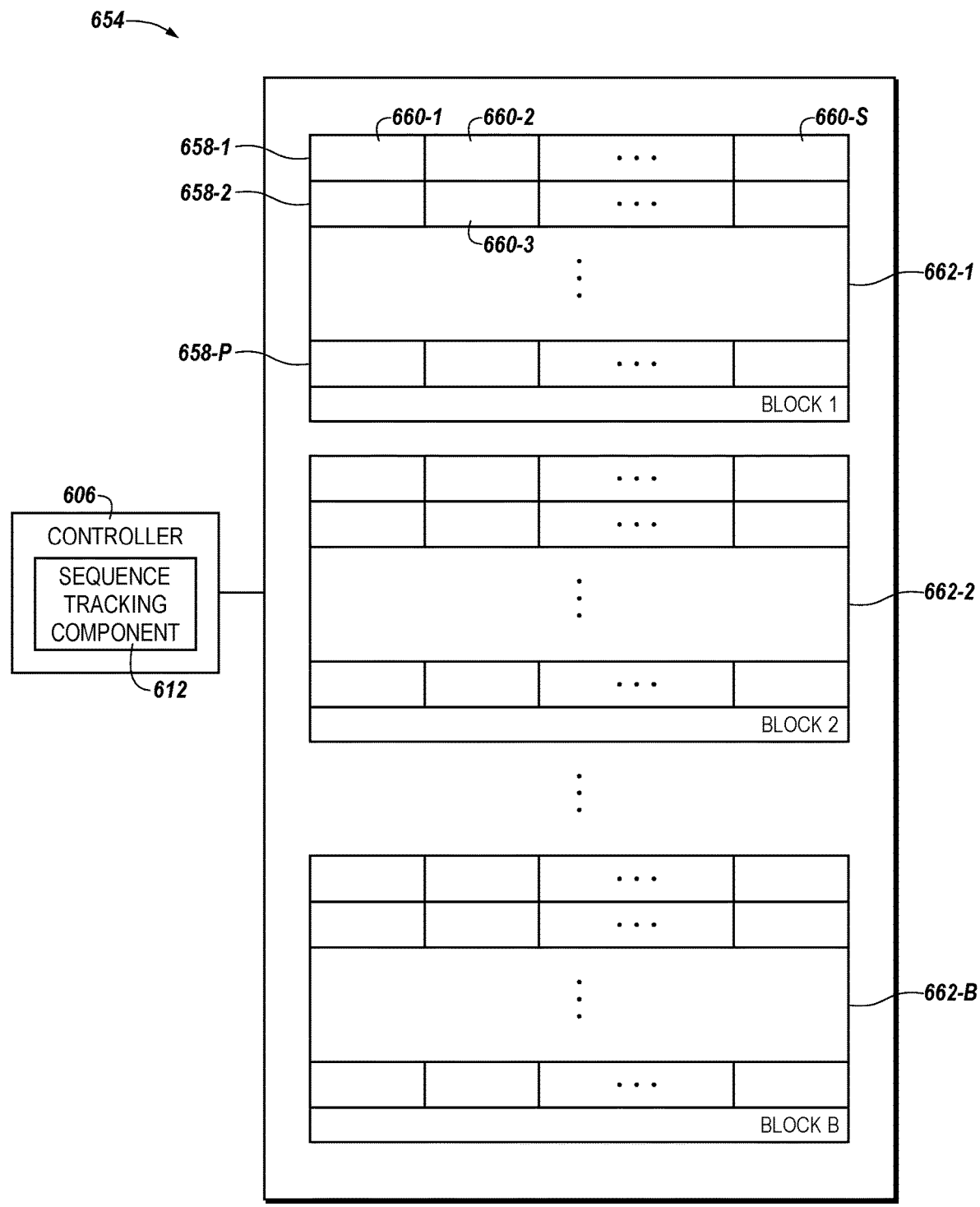
FIG. 6 illustrates a diagram of a portion of a memory array having physical blocks coupled to a controller in accordance with some embodiments of the present disclosure.

FIG. 6 illustrates a diagram of a portion of a memory array 665 having physical blocks 662 coupled to a controller 606 in accordance with some embodiments of the present disclosure. The controller 606 can be analogous to the memory sub-system controller 106 illustrated in FIG. 1. The controller 606 can further include a sequence tracking component 612. As described herein, the sequence tracking component 612, in some embodiments, can cause the controller 606 to perform operations described herein with respect to the sequence tracking component 112.

The memory array 665 can represent a memory array of the non-volatile memory device 116 in FIG. 1, for example. The memory array 665 can be, for example, a NAND flash memory array. As an additional example, memory array 665 can be an SCM array, such as, for instance, a three-dimensional cross-point (3D Cross-point) memory array, a ferroelectric RAM (FRAM) array, or a resistance variable memory array such as a PCRAM, RRAM, or spin torque transfer (STT) array, among others. Further, although not shown in FIG. 6, memory array 665 can be located on a particular semiconductor die along with various peripheral circuitry associated with the operation thereof.

As shown in FIG. 6, the memory array 665 has a number of physical blocks 662-1 (BLOCK 1), 662-2 (BLOCK 2), . . . , 662-B (BLOCK B) of memory cells. The memory cells can be operated with characteristics tailored to a performance target of the cyclic buffer or the snapshot as described herein). A number of physical blocks 662 of memory cells can be included in a plane of memory cells, and a number of planes of memory cells can be included on a die. For instance, in the example shown in FIG. 6, each physical block 662 can be part of a single die. That is, the portion of the memory array 665 illustrated in FIG. 6 can be a die of memory cells.

As shown in FIG. 6, each physical block 662 includes a number of physical rows (e.g., rows 658-1, 658-2, . . . , 658-R) of memory cells coupled to access lines (e.g., word lines). Further, although not shown in FIG. 6, the memory cells can be coupled to sense lines (e.g., data lines and/or digit lines). As one of ordinary skill in the art will appreciate, each row 658 can include a number of pages of memory cells (e.g., physical pages). A physical page refers to a unit of programming and/or sensing (e.g., a number of memory cells that are programmed and/or sensed together as a functional group). In the embodiment shown in FIG. 6, each row 658 comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple logical pages of data (e.g., an upper page of data and a lower page of data, with each cell in a physical page storing one or more bits towards an upper page of data and one or more bits towards a lower page of data).

As shown in FIG. 6, a row 658 of memory cells can comprise a number of physical sectors 660-1, 660-2, . . . , 660-S (e.g., subsets of memory cells). Each physical sector 660 of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 660, can store system data, user data, and/or overhead data, such as error correction code (ECC) data, LBA data, and metadata.

Figure 7:
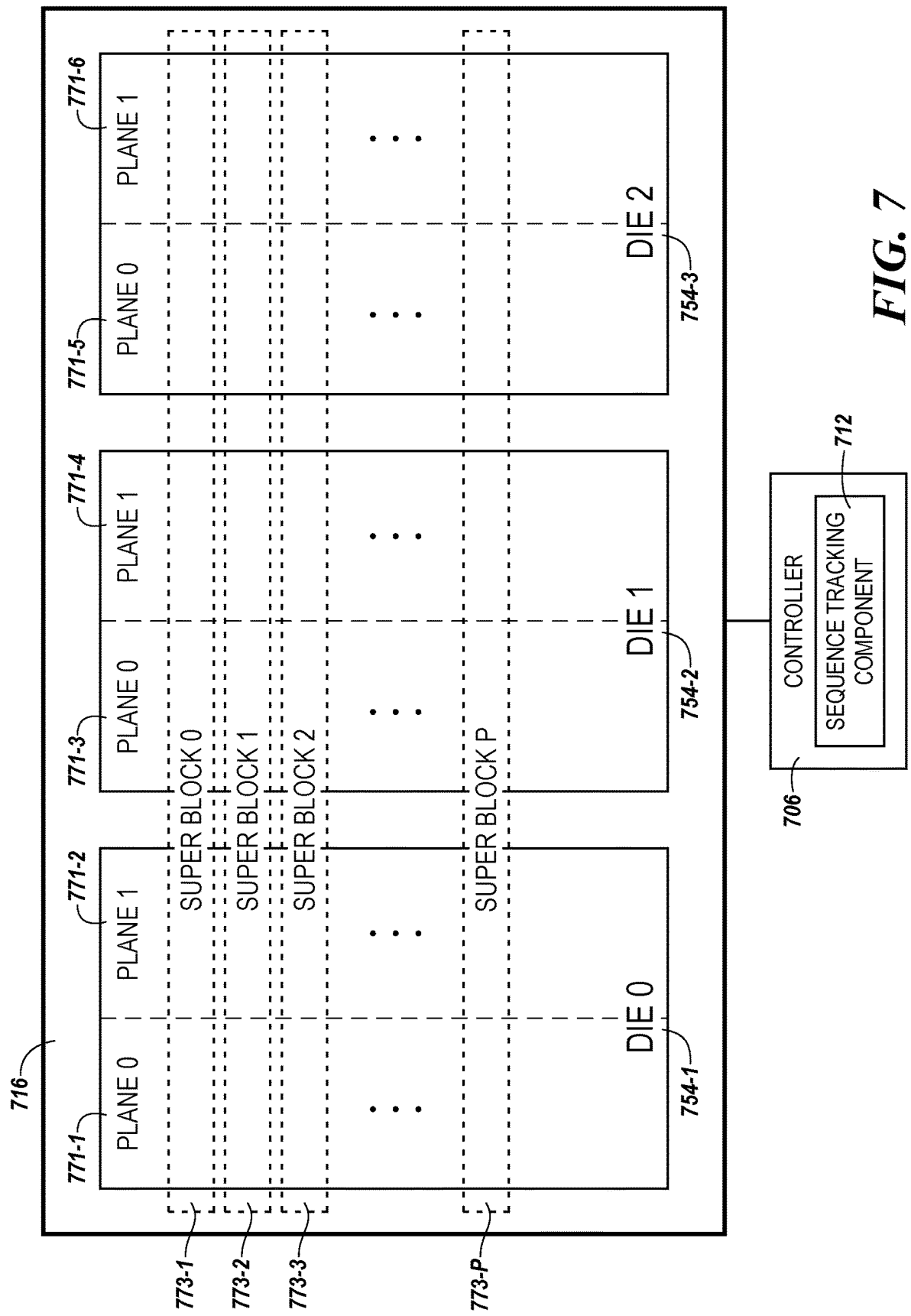
FIG. 7 illustrates a diagram of a portion of a memory array having superblocks in accordance with some embodiments of the present disclosure.

FIG. 7 illustrates a diagram of a number of memory dies 754 having superblocks 734 in accordance with some embodiments of the present disclosure. Each memory die 754-1, 754-2, and 754-3 can correspond to the memory array/die 754 of FIG. 7 and are located on a memory device 716 (analogous to the memory device 116 illustrated in FIG. 1) that is coupled to a controller 706. The controller 706 can be analogous to the memory sub-system controller 106 illustrated in FIG. 1. The controller 706 can further include a sequence tracking component 712. As described herein, the sequence tracking component 712, in some embodiments, can cause the controller 706 to perform operations described herein with respect the sequence tracking component 112.

Each memory die 754-1, 754-2, and 754-3 can include multiple planes. As illustrated in FIG. 7, for example, the memory die 754-1 includes two planes 771-1 (PLANE 0) and 771-2 (PLANE 1); the memory die 754-2 includes two planes 771-3 (PLANE 0) and 771-4 (PLANE 1); and the memory die 754-3 includes two planes 771-5 (PLANE 0) and 771-6 (PLANE 1), although each memory die is not limited to a particular number of planes it can include.

As used herein, the term "superblock" can refer to a group of memory cells whose memory cells are distributed over multiple planes of a memory die and/or multiple memory dies. For example, as illustrated in FIG. 7, memory cells of each of the superblocks 734-1 (SUPERBLOCK 0), 734-2 (SUPERBLOCK 1), 734-3 (SUPERBLOCK 2), and 734-P (SUPERBLOCK P) are distributed over a respective portion of the planes 771-1 and 771-2 of the memory die 754-1, the planes 771-3 and 771-4 of the memory die 754-2, and the planes 771-5 and 771-6 of the memory die 754-3, as illustrated in FIG. 7. Although three dies are illustrated in FIG. 7, a superblock is not limited to a particular number of dies over which memory cells of the superblock can be distributed.

In some embodiments, an erase operation, can be performed concurrently on multiple blocks of a superblock. Alternatively speaking, multiple blocks that form a same superblock can be erased substantially simultaneously. Similarly, a write and/or read operation can be performed concurrently on pages of a superblock. Alternatively speaking, multiple pages that form a same superblock can be written and/or read substantially simultaneously.

Figure 8:
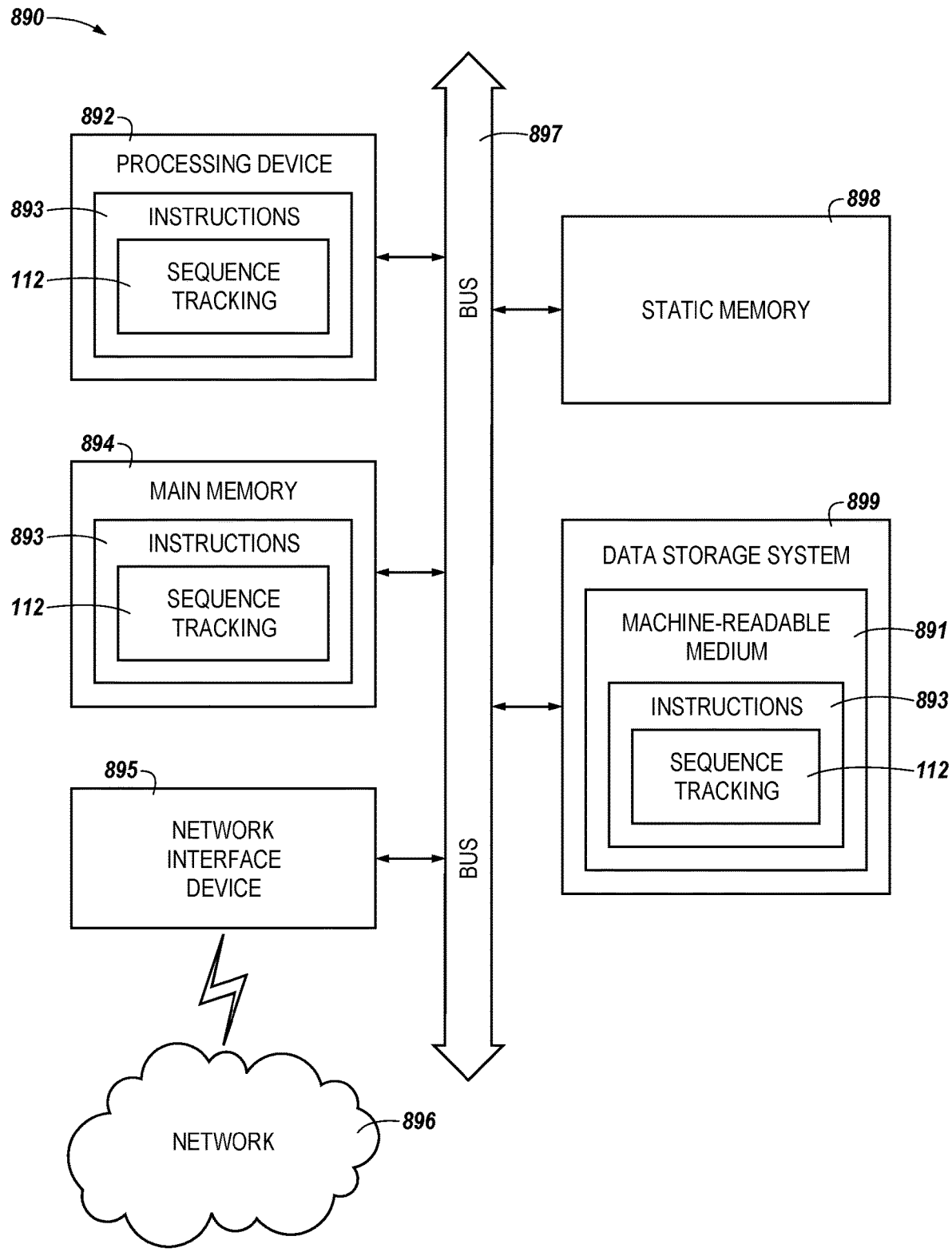
FIG. 8 is a block diagram of an example computer system in which embodiments of the present disclosure may operate.

FIG. 8 illustrates an example machine of a computer system 890 within which a set of instructions, for causing the machine to perform one or more of the methodologies discussed herein, can be executed. In some embodiments, the computer system 890 can correspond to a host system (e.g., the host system 102 of FIG. 1) that includes, is coupled to, or utilizes a memory sub-system (e.g., the memory sub-system 104 of FIG. 1) or can be used to perform the operations of a controller (e.g., to execute an operating system to perform operations corresponding to the sequence tracking component 112 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 890 includes a processing device 892, a main memory 894 (e.g., read-only memory (ROM), flash memory, dynamic random access memory (DRAM) such as synchronous DRAM (SDRAM) or Rambus DRAM (RDRAM), etc.), a static memory 898 (e.g., flash memory, static random access memory (SRAM), etc.), and a data storage system 899, which communicate with each other via a bus 897.

The processing device 892 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 892 can also be one or more special-purpose processing devices such as an application specific integrated circuit (ASIC), a field programmable gate array (FPGA), a digital signal processor (DSP), network processor, or the like. The processing device 892 is configured to execute instructions 893 for performing the operations and steps discussed herein. The computer system 890 can further include a network interface device 895 to communicate over the network 896.

The data storage system 899 can include a machine-readable storage medium 891 (also known as a computer-readable medium) on which is stored one or more sets of instructions 893 or software embodying one or more of the methodologies or functions described herein. The instructions 893 can also reside, completely or at least partially, within the main memory 894 and/or within the processing device 892 during execution thereof by the computer system 890, the main memory 894 and the processing device 892 also constituting machine-readable storage media. The machine-readable storage medium 891, data storage system 899, and/or main memory 894 can correspond to the memory sub-system 110 of FIG. 1.

In one embodiment, the instructions 893 include instructions to implement functionality corresponding to a sequence tracking component (e.g., the sequence tracking component 112 of FIG. 1). While the machine-readable storage medium 891 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a memory device; and
a processing device communicatively coupled to the memory device, wherein the processing device is to:
write data to a number of groups of memory cells of the memory device in a physically non-contiguous manner;
track a sequence in which the number of groups of memory cells were written with the data; and
generate, in response to a trigger event, an entry including the tracked sequence to identify at least a portion of the number of groups of memory cells storing data received over a predefined period preceding the trigger event based at least in part on the tracked sequence, wherein the processing device is further to associate, to the entry:
a logical address corresponding to a first page of the at least the portion of the number of groups of memory cells, wherein the first page corresponds to a start time of the predefined period; and
a logical address corresponding to a second page of the at least the portion of the number of groups of memory cells, wherein the second page corresponds to an end time of the predefined period.

2. The system of claim 1, wherein the processing device is to determine the at least portion of the number of groups of memory cells comprising the data further based on:
a known size of each one of the number of groups of memory cells; and
a known size of the data received over the predefined period preceding the trigger event.

3. The system of claim 1, wherein the processing device is to identify the at least the portion of the number of groups of memory cells without maintaining a logical to physical (L2P) table.

4. The system of claim 3, wherein groups of memory cells respectively corresponding to logically sequential entries of the L2P table does not correspond to the sequence in which the number of groups of memory cells were written with the data.

5. The system of claim 1, wherein at least a portion of the number of groups of memory cells corresponds to a super-block whose memory cells are distributed over multiple memory dies of the memory device.

6. A system, comprising:
a memory device comprising a plurality of blocks each comprising a plurality of pages; and
a processing device communicatively coupled to the memory device, wherein the processing device is to:
write data to the plurality of blocks in a physically non-contiguous manner, wherein the data are sequentially written to the plurality of pages within each one of the plurality of blocks; and
generate, in response to a trigger event, an entry including a sequence in which a first portion of the plurality of blocks was written with data received over a predefined period preceding the trigger event, wherein the generated entry is stored in the memory device, wherein the processing device is further to:
generate, in response to another trigger event, an entry including another sequence in which a second portion of the plurality of blocks were written with data received over the predefined period preceding the another trigger event; and
store the entry in the memory device.

7. The system of claim 6, wherein the processing device is to associate, to the entry:
a logical address corresponding to a first page of the first portion of the plurality of blocks, wherein the first page corresponds to a start time of the predefined period; and
a logical address corresponding to a second page of the first portion of the plurality of blocks, wherein the second page corresponds to an end time of the predefined period.

8. The system of claim 6, wherein each one of the plurality of blocks corresponds to a superblock whose memory cells are distributed over multiple memory dies of the memory device.

9. The system of claim 6, wherein the system comprises a solid state drive to provide event recorder storage for an autonomous vehicle.

10. The system of claim 6, wherein the processing device is to identify the first portion of the plurality of blocks and the sequence based on:
a known size of each page of each one of the plurality of blocks; and
a quantity of pages within each one of the plurality of blocks.

11. The system of claim 6, wherein the processing device is to perform, in response to a program failure of writing data to one of the plurality of blocks, a refresh operation on the one of the plurality of blocks to copy the data from the one of the plurality of blocks to another one of the plurality of blocks.

12. The system of claim 11, wherein the processing device is to modify, in response to the refresh operation, the sequence to replace the one of the plurality of blocks of the sequence with the another one of the plurality of blocks.

13. The system of claim 6, wherein the processing device is to, in response to a program failure subsequent to writing data to a particular page of one of the plurality of blocks, associate a logical address corresponding to the particular page.

14. A method, comprising:
writing a first portion of data sequentially to a number of pages of a first block of a plurality of blocks by writing the first portion of data sequentially at least to a first page and a second page of the number of pages;

subsequent to writing the first portion of the data sequentially to the number of pages of the first block, writing a second portion of the data sequentially to a number of pages of a second block of the plurality of blocks, wherein the second block is not contiguous to the first block;

determining that a trigger event has occurred while writing the second portion of the data sequentially to a particular page of the second block;

tracking, reversely from the particular page of the second block, the plurality of blocks that were written with an amount of the data having a known size corresponding to a predefined period preceding the trigger event;

generating and storing, in a memory device, an entry comprising:
- a sequence in which the plurality of blocks were written with the amount of the data; and
- a logical address of the particular page of the second block; and associating a logical address of the first page of the first block to the entry in response to writing of a portion of the first portion of data to the second page is determined to have failed.

15. The method of claim 14, further comprising tracking, reversely from the particular page of the second block, the plurality of blocks that were written with the amount of the data further based on:
- a known size of each one of the plurality of blocks; and
- a known size of each one of the number of pages of each block of the plurality.

16. The method of claim 14, further comprising tracking the plurality of blocks without maintaining a logical to physical (L2P) table.

17. The method of claim 14, further comprising reading, when retrieving the amount of the data, data from a number of pages of the first block sequentially up to the first page.

18. The method of claim 14, further comprising:
- performing a refresh operation on the first block to copy data stored in a number of pages up to the first page to a third block of the plurality of blocks; and
- modifying the sequence of the entry to replace the first block with the third block.

* * * * *